United States Patent
Xu et al.

(10) Patent No.: US 8,034,203 B2
(45) Date of Patent: Oct. 11, 2011

(54) GYPSUM WALLBOARD WITH IMPROVED NAIL PULL STRENGTH AND THE METHOD FOR MAKING SAME

(75) Inventors: Yufeng Xu, Gurnee, IL (US); Renee J. Weinberger, Waukegan, IL (US)

(73) Assignee: United States Gypsum Company, Chicago, IL (US)

(*) Notice: Subject to any disclaimer, the term of this patent is extended or adjusted under 35 U.S.C. 154(b) by 455 days.

(21) Appl. No.: 11/735,060

(22) Filed: Apr. 13, 2007

(65) Prior Publication Data

US 2008/0254317 A1    Oct. 16, 2008

(51) Int. Cl.
  B29C 65/00  (2006.01)
  B32B 13/00  (2006.01)
  B32B 37/00  (2006.01)
  B32B 9/00   (2006.01)
  B32B 19/00  (2006.01)

(52) U.S. Cl. .......................... 156/39; 428/688
(58) Field of Classification Search ............ 156/39; 428/688
See application file for complete search history.

(56) References Cited

U.S. PATENT DOCUMENTS

| | | |
|---|---|---|
| 2,206,042 A | 7/1940 | Novak |
| 3,440,134 A | 4/1969 | Murphy, Jr. |
| 3,951,735 A | 4/1976 | Kondo et al. |
| 4,081,316 A | 3/1978 | Aberg et al. |
| 4,119,752 A | 10/1978 | Long |
| 4,123,489 A | 10/1978 | Kelley |
| 4,201,595 A | 5/1980 | O'Neill |
| 4,780,179 A | 10/1988 | Clement |
| 4,853,085 A | 8/1989 | Johnstone et al. |
| 5,110,412 A | 5/1992 | Fuentes et al. |
| 5,302,244 A | 4/1994 | Nguyen |
| 5,350,493 A | 9/1994 | Nguyen |
| 5,429,716 A | 7/1995 | Hache et al. |
| 5,464,501 A | 11/1995 | Kogan et al. |
| 5,503,709 A | 4/1996 | Burton |
| 5,587,048 A | 12/1996 | Streisel et al. |
| 5,620,510 A * | 4/1997 | Mentzer et al. ........... 106/206.1 |
| 5,665,205 A | 9/1997 | Srivatsa et al. |
| 5,772,847 A | 6/1998 | Simpson et al. |
| 5,895,556 A | 4/1999 | Ferguson et al. |

(Continued)

OTHER PUBLICATIONS

Khantayanuwong, S. T. Enomae and F. Onabe, "Effect of Fiber Hornification in Recycling on Bonding Potential at Interfiber Crossings: Confocal Laser-Scanning Microscopy." Japan Tappi J. 56 (2): 239-245, 2002, [retrieved on Oct. 11, 2006] retrieved from https://pindex.ku.ac.th/file-research/Hornification1.pdf.

(Continued)

Primary Examiner — James Sells
Assistant Examiner — Michael Orlando
(74) Attorney, Agent, or Firm — Novak Druce + Quigg, LLP; Pradip K. Sahu

(57) ABSTRACT

Repulped fiber that has been treated with an aqueous solution of a caustic selected from sodium hydroxide, potassium hydroxide and sodium carbonate, is used to make wallboard paper that is used to make a gypsum wallboard having improved nail pulling strength compared to gypsum wallboard made with fiber wallboard paper that has not been treated with caustic.

20 Claims, 7 Drawing Sheets

EFFECT OF 0.2% SODIUM HYDROXIDE TREATMENT ON THE NAIL PULL STRENGTH OF GYPSUM BOARD

U.S. PATENT DOCUMENTS

| | | | |
|---|---|---|---|
| 5,925,218 | A | 7/1999 | Ogden |
| RE36,424 | E | 12/1999 | Clement |
| 6,221,521 | B1 | 4/2001 | Lynn et al. |
| 6,251,979 | B1 * | 6/2001 | Luongo ............... 524/423 |
| 6,416,695 | B1 | 7/2002 | Miller |
| 6,706,148 | B1 | 3/2004 | Joisson et al. |
| 6,746,781 | B2 * | 6/2004 | Francis et al. ......... 428/537.5 |
| 6,991,705 | B2 | 1/2006 | Leino et al. |
| 2001/0007277 | A1 * | 7/2001 | Jobling et al. ............. 162/5 |
| 2001/0020520 | A1 | 9/2001 | Hu et al. |
| 2003/0150570 | A1 * | 8/2003 | Leino et al. ............... 162/9 |
| 2004/0091751 | A1 | 5/2004 | Savoly et al. |

OTHER PUBLICATIONS

Diniz et al., "Hornification—Its Origin and Interpretation in Wood Pulps" (Abstract), [retrieved on Oct. 11, 2006] retrieved from http://www.springerlink.com/content/xdhvcOqq8vhkn5ah/#search=%22hornification%22.

Weigert et al., "Chemical Modification of Pulps in Order to Minimize Their Hornification Sensitivity" (Summary), [retrieved on Oct. 11, 2006] retrieved from http://www.cellulose-papier.chemie.tu-darmstadt.de/English/Publications/Abstracts_E/hornification_e.htm.

* cited by examiner

FIG. 2 NAIL PULL STRENGTH OF SMALL BENCH BOARD WITH CAUSTIC TREATED AND UNTREATED FIBERS (NOT NORMALIZED WITH PAPER BASIS WEIGHT)

FIG. 3   NAIL PULL STRENGTH OF SMALL BENCH BOARD WITH CAUSTIC TREATED AND UNTREATED FIBERS (NORMALIZED WITH PAPER BASIS WEIGHT)
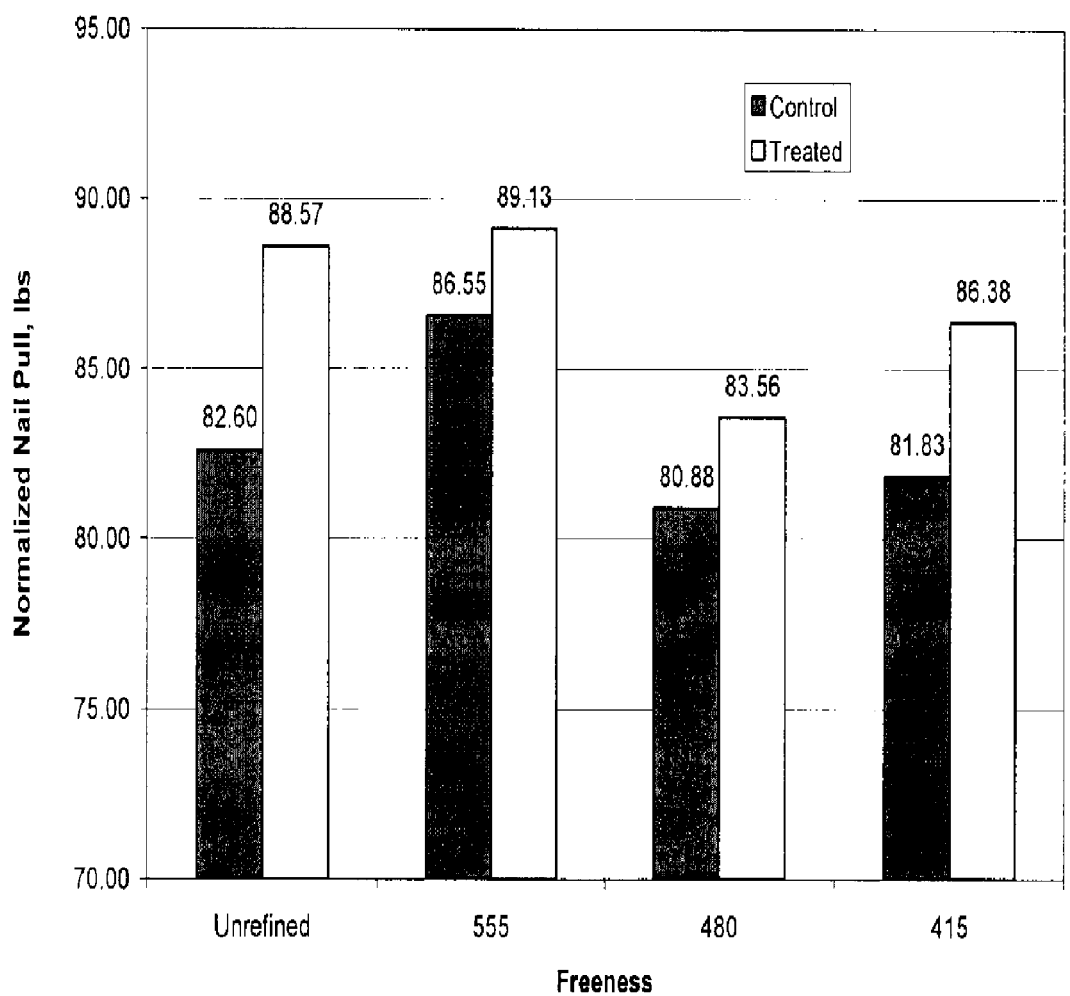

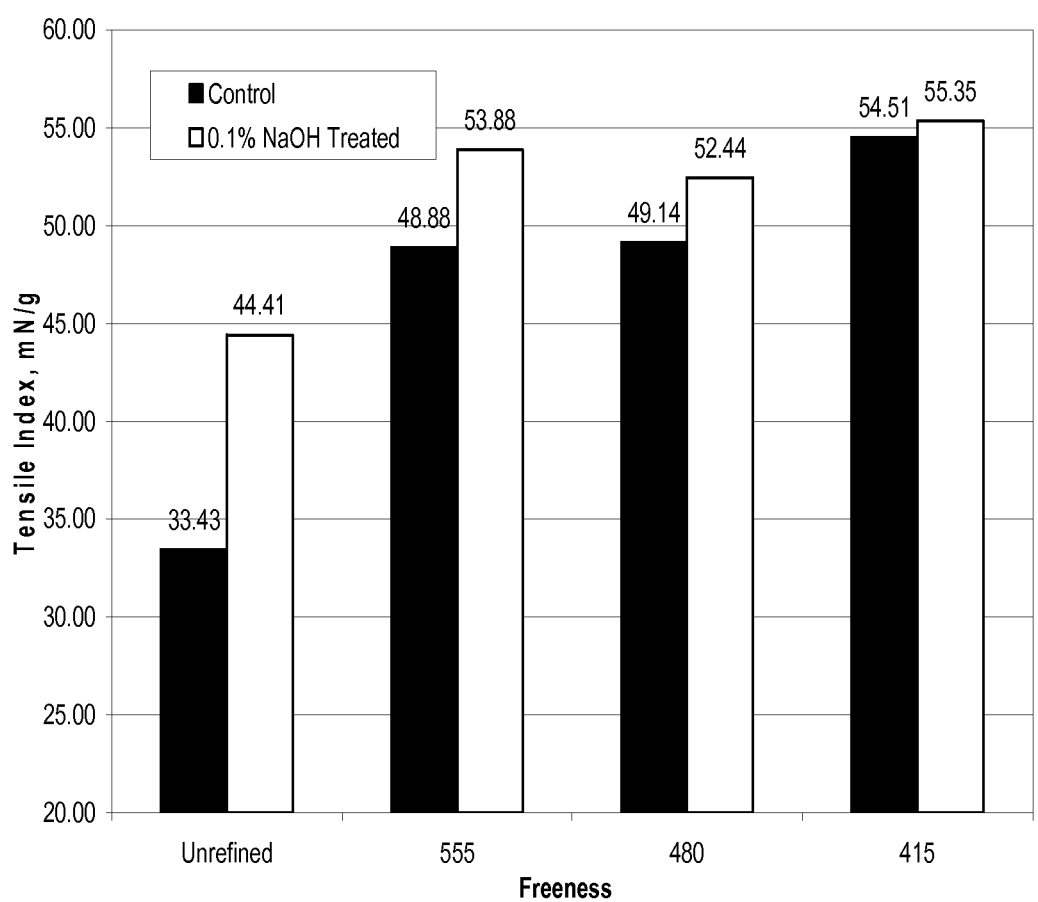
FIG. 4 TENSILE STRENGTH OF PAPER WITH CAUSTIC TREATED AND UNTREATED FIBERS FIG. 5 EFFECT OF 0.2% SODIUM HYDROXIDE TREATMENT ON THE NAIL PULL STRENGTH OF GYPSUM BOARD
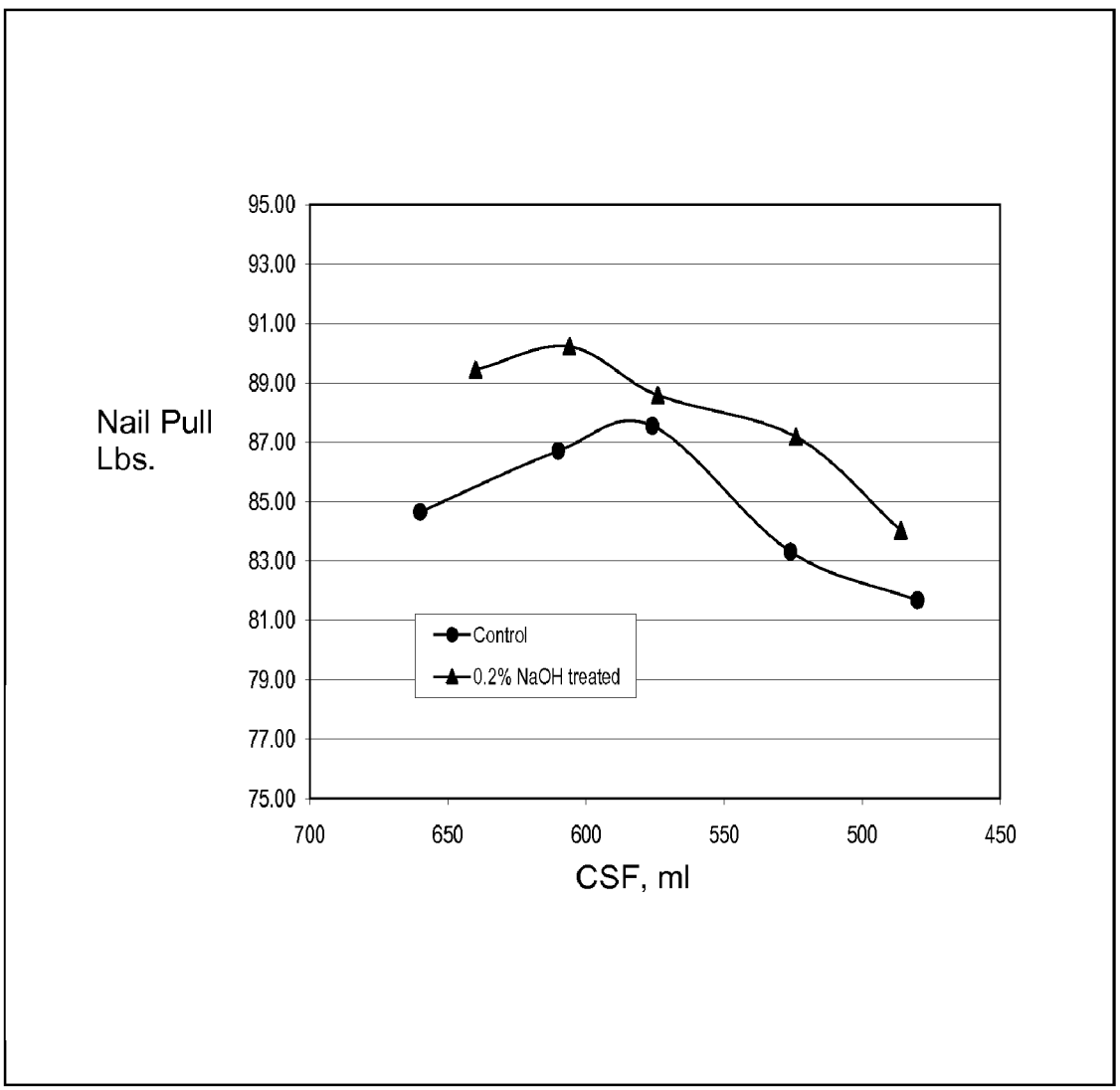

FIG. 6. EFFECT OF 0.2% SODIUM HYDROXIDE TREATMENT ON THE NAIL PULL STRENGTH OF GYPSUM BOARD (NAIL PULL RESULTS WERE NORMALIZED WITH PAPER BASIS WEIGHT)
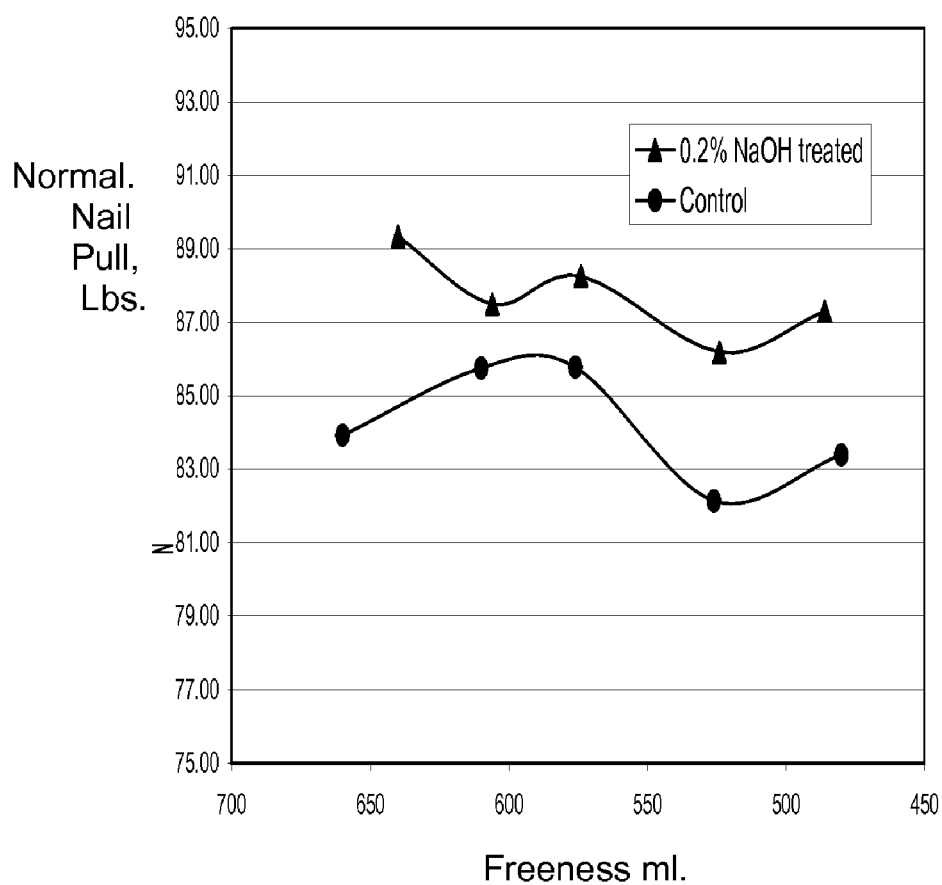

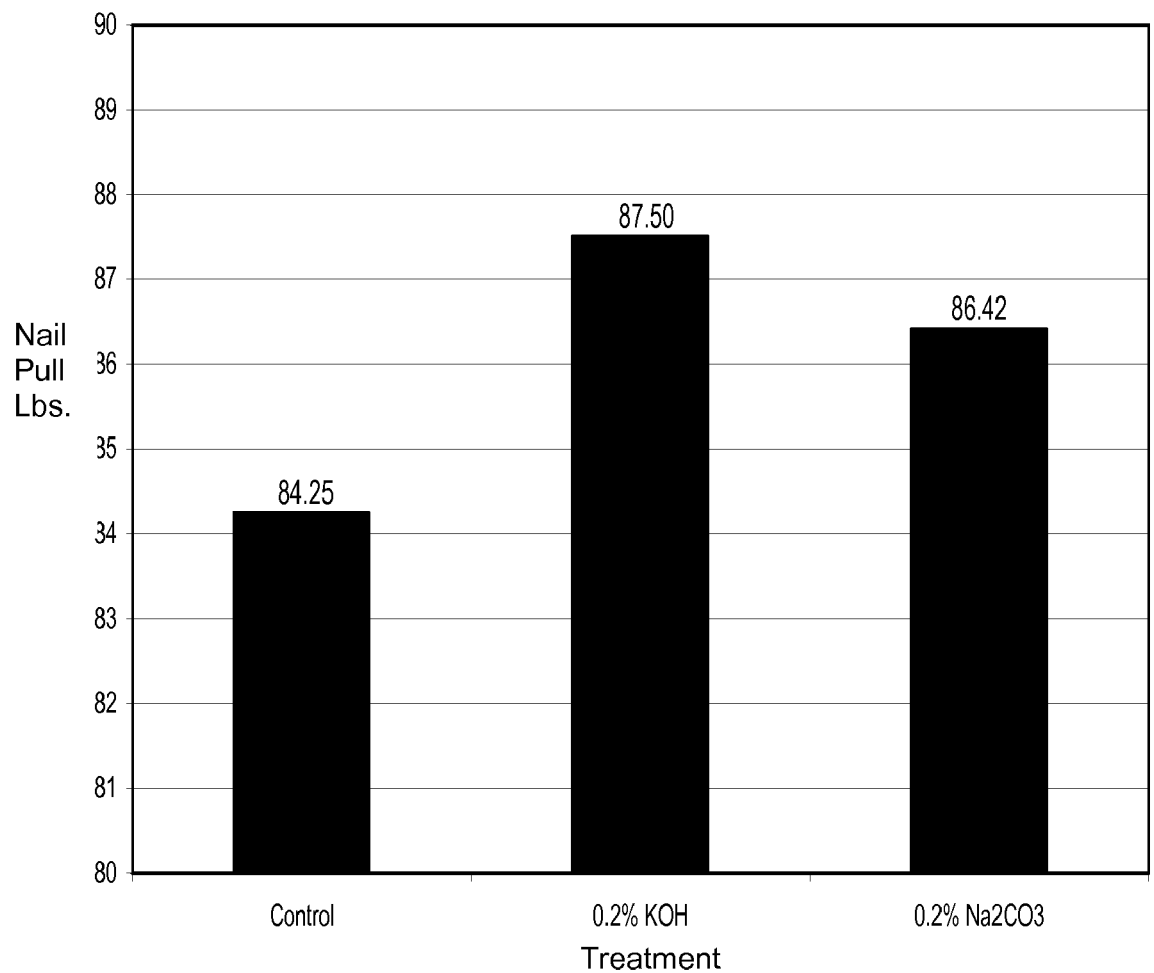
FIG. 7 EFFECT OF POTASSIUM HYDROXIDE AND SODIUM CARBONATE TREATMENAT ON THE NAIL PULL STRENGTH OF GYPSUM BOARD (NAIL PULL RESULTS WERE NORMALIZED WITH PAPER BASIS).

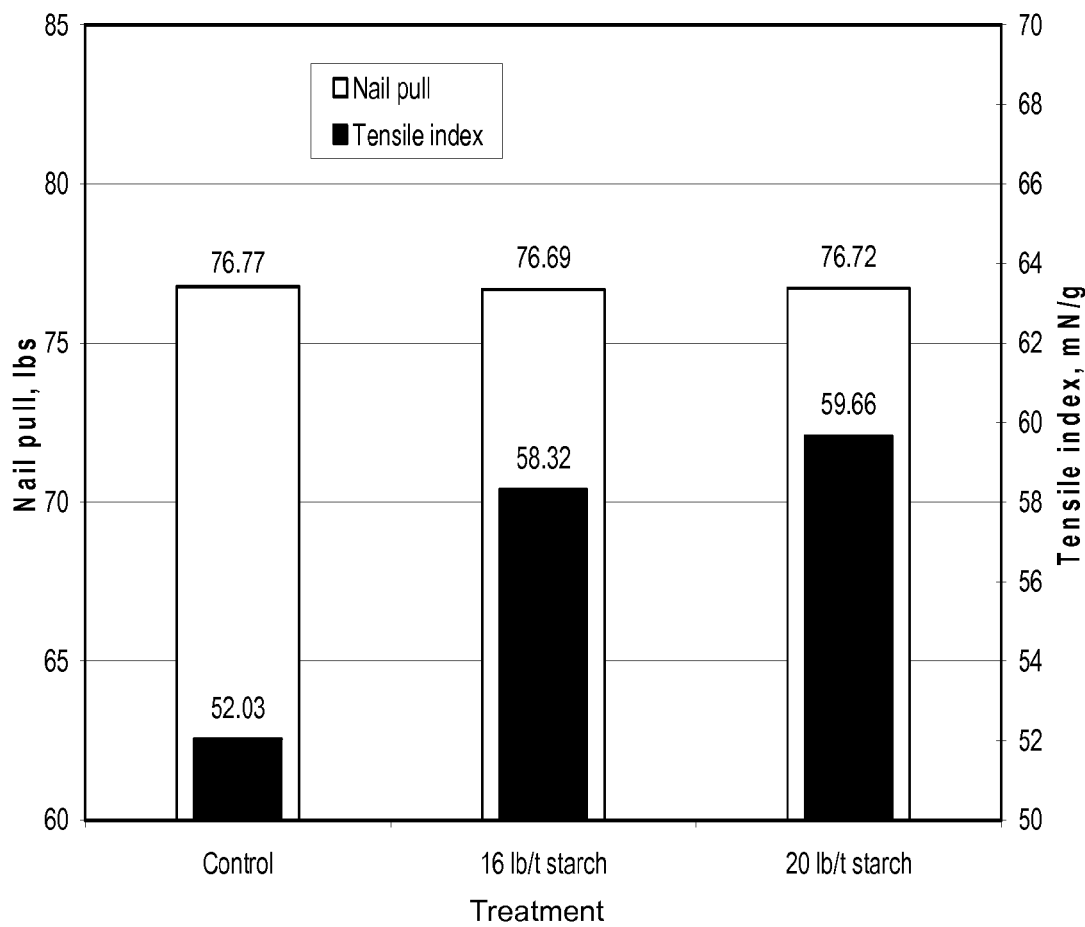
FIG. 8 EFFECT OF CATIONIC STARCH ON THE NAIL PULL STRENGTH OF GYPSUM BOARD (NAIL PULL RESULTS WERE NORMALIZED WITH PAPER BASIS WEIGHT)

GYPSUM WALLBOARD WITH IMPROVED NAIL PULL STRENGTH AND THE METHOD FOR MAKING SAME

FIELD OF THE INVENTION

This invention relates to treated gypsum board paper, and particularly to the treatment of recycled fiber used to make the wallboard paper with an aqueous caustic solution to improve the nail-pull out strength of the gypsum wallboard made with said treated fiber.

BACKGROUND OF THE INVENTION

Gypsum wallboard is manufactured by preparing slurry of calcined gypsum and other additives with an excess of water, forming this slurry into board form within an envelope of wallboard paper, and allowing the gypsum to harden while supported in board form. A great excess of water must then be removed, in a high temperature dryer, this moisture coming out of the gypsum core by passing through the pores of the paper. In order for the moisture to be able to pass through the paper at an acceptable rate, in present day high speed plants, it is essential that the paper has a porosity value of about 300 seconds or lower, as determined on a Gurley densometer, using TAPPI Standards T460 M-49 test procedure.

It has long been recognized that it can be advantageous to improve the properties of the paper surface of a gypsum wallboard, but that treatment of the paper surface before formation into a board generally causes manufacturing problems.

Paper for gypsum board is conventionally made by pulping up waste paper constituents of old corrugated paper, or kraft cuttings and waste news. In cleaning, screening and refining the suspended materials in water suspension, the processed paper stock is diluted still further with water and then formed by draining the plies of paper on several continuously moving wire cylinders, where the separate plies are joined together by a carrying felt. The weak paper web is then dewatered in a press section where water is pressed out of the web. The pressed paper is dried in a multi-cylinder drying section with steam added to each cylinder. The dried paper is subjected to a squeezing or calendaring operation for uniformity in thickness and is then finally wound into rolls. The paper is subsequently utilized as paper cover sheets to form gypsum wallboard by depositing a calcined gypsum slurry between two sheets, and permitting the gypsum to set and dry. More complete details concerning the processing of paper for use in gypsum wallboard can be found in U.S. Pat. No. 4,959,272 of Long, the disclosure of which is incorporated herein by reference in its entirety.

U.S. Pat. No. 5,772,847 to Simpson et al. discloses a method for forming pulp from processed recycled fibers which includes the treatment of processed recycled fibers in a pulper with an aqueous composition that includes a caustic agent, such as sodium hydroxide, a buff/dispersing agent, a bleaching agent, a chelating agent, and a de-inking agent before the pulp is processed into a paper product. The reference does not address the use of the paper for making gypsum wallboard or the unexpected improvement in the nail pull strength of the wallboard made with the processed fibers.

U.S. Pat. No. 5,503,709 to Burton discloses an environmentally improved process for preparing recycled ligno-cellulosic materials for bleaching that includes the use of caustic for treatment of repulped material. The properties of the repulped paper or its improvement in the nail pull strength of gypsum wallboard made with the repulped material is not disclosed.

U.S. Pat. No. 6,991,705 to Leino et al. discloses a process for stabilizing the pH of a pulp suspension with both sodium hydroxide and carbon dioxide and for producing paper from the stabilized pulp, but does not teach the use of the paper in gypsum wallboard or the improvement of the nail pull strength of gypsum wallboard made with the pH stabilized pulp U.S. Pat. No. Re. 36,424 to Clement discloses a method for producing pulp from printed "unselected" waste paper that uses alkaline treatment of the waste paper to remove ink.

BRIEF DESCRIPTION OF THE INVENTION

The present invention involves a method of making a gypsum wallboard with improved nail pull strength comprising the pretreatment of recycled fibers that are used to make wallboard paper with a caustic prior to forming the wall board paper which is used to make the gypsum wallboard.

The invention further involves an improved gypsum wallboard having an unexpected improvement in nail pull-out strength over gypsum wallboard made with paper that is made with fiber that has not been treated with a caustic such as sodium hydroxide prior to the making of the wallboard paper to improve the nail pull strength value of the final gypsum wallboard.

Caustic solution have previously used in paper fiber recycling for removal of ink, defibration and in repulping of unbleached wet strength grades of fiber to destroy the bonding formed by wet strength resin adhesives typically polyamide resins.

Caustic solutions have also been suggested for use in recycled fibers to improve the common strength i.e. tensile and burst strength of the paper made from the fibers of the paper.

Applicant has unexpected found that the pretreatment of recycled fiber before dewatering to make paper for gypsum wallboard has the unexpected improvement of the nail pull strength of a gypsum wallboard product that is made with the pretreated wallboard paper compared to wallboard that is made with untreated fiber.

The above and other advantages of the invention will be more readily apparent when considered in relation to the detailed description of the invention and embodiments, as set forth in the specification and the drawing.

BRIEF DESCRIPTION OF THE DRAWINGS

FIGS. 2 and 3 are bar graphs of nail pull strength, and normalized Nail Strength, respectively, for gypsum wallboard made with the caustic treated paper fiber of this invention versus gypsum wallboard made with untreated fiber wallboard paper.

FIG. 4 is a graph of tensile index versus degree of freeness to show the effect of caustic pulping on tensile strength with refining of paper handsheets made in accordance with the invention.

FIG. 5 is a graph of the results of Example 2 for the effect of treatment of fiber with 0.2% sodium hydroxide on the nail pull strength of gypsum board.

FIG. 6 is a graph of the results of Example 2 on the improvement of nail pull strength of gypsum board made with the treated fibers of the invention compared to paper with untreated fiber were the results are normalized from the weight of the paper.

FIG. 7 is a bar graph of the results of Example 3 illustrating the improvement in nail pull strength of gypsum board made with paper made with potassium hydroxide and sodium carbonate treated fiber.

FIG. 8 is a bar graph of the results of comparative Example 1 that shows the increase in paper tensile strength when treated with a cationic starch conventional paper tensile strength improvement agent and that there is no improvement in nail pull strength in gypsum board that is made with the starch treated fiber compared to the gypsum board made with untreated fiber.

DETAILED DESCRIPTION OF THE PREFERRED EMBODIMENTS

Figure 1:
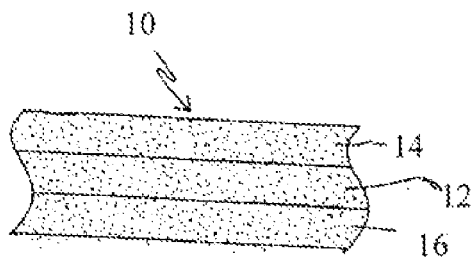
FIG. 1 is a cut-away cross-sectional view of the wallboard of this invention.
Figure 1:
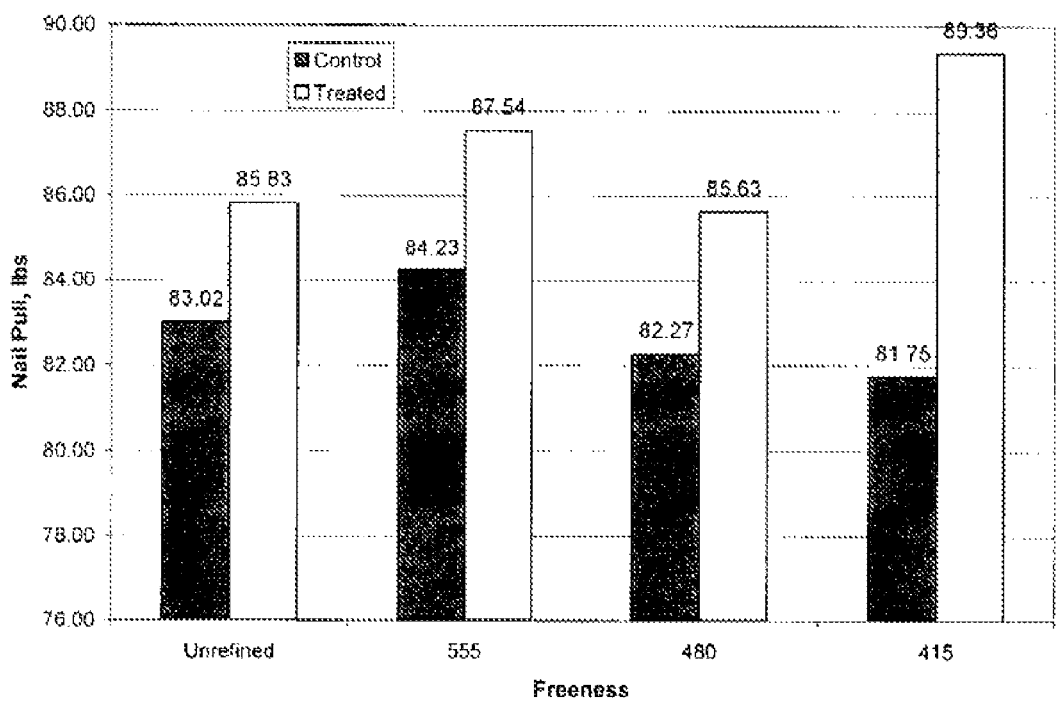

Referring to FIG. 1, a gypsum wallboard 10 is shown having a gypsum core 12, a top face paper 14 extending throughout the top face of the core 12, The bottom face paper 16 extending substantially throughout the bottom face of core 12 of wallboard 10. In accordance with conventional manufacturing process, the top face paper 14 would be extended over the side edges of the wall board (not shown) to overlap the bottom face paper 16 on the bottom face of the wallboard 10.

Referring again to the cross sectional view of the gypsum board 10 in FIG. 1, the top face paper 14 and the bottom face paper 16 on each surface of the gypsum core 12, have a thickness of about 0.3-0.35 mm, and consist of a plurality of cellulose fibers. All of the fibers have been treated with a caustic solution in a fiber hydropulper or a bath of caustic solution prior to being dewatered in a press, etc. and then formed into a sheet of wallboard paper.

Gypsum wallboard is typical made by casting an aqueous slurry of a settable calcined gypsum with option additive such as setting retardants or accelerants, from a mixer into a board form between two cover sheets of wallboard paper on a conveyor belt, pressing the wet gypsum board to a desired thickness, allowing the gypsum to set to form a wet gypsum board or intermediate board with a wet gypsum core, cutting the wet gypsum board to size, and then dewatering the gypsum and paper cover sheets by drying in a conventional wall board plant kiln for about 120 minutes to a final gypsum core temperature of about 77° C. to 93° C. (170° to 210° F.) to cause the excess water in the wet gypsum core of the intermediate gypsum board to pass through the paper cover sheets to produce the final dihydrate gypsum wallboard.

Conventional gypsum wallboard manufacturing processes that can be used to make the improved wallboard of this invention are shown in more detail, for example, in U.S. Pat. Nos. 3,951,735 to Kondo et al.; 4,119,752 to Long and U.S. Pat. No. 4,201,595 to O'Neill, the disclosure of which are incorporated herein by reference in their entirety.

Among the required properties of gypsum wallboard is the nail pull strength of the wallboard that is specified by ASTM method as the measurement of the resistance of wallboard to the nail head when the nail is driven into the wall, such as is commonly the case in installation of gypsum wallboard. Nail pull strength is determined by both the strength of the wallboard paper and the gypsum core.

The relation of the strength of the wallboard paper to the nail pull strength of the final gypsum wallboard is not directly related to the individual tensile strength or burst strength of the paper. This has been shown in unsuccessful prior art approaches to strengthening the common tensile strength of the paper through use of starch or other coatings and additives, which have not produced any improvement in the nail pull strength of the gypsum wallboard.

As seen in the results of comparative Example 1, below, in the graph of FIG. 8, the use of a conventional paper tensile strength pre-treatment of fibers with cationic starch in varying concentrations can improve the tensile strength of the paper, but it has no benefit in increasing the nail pull strength of gypsum board made with the cationic starch treated wall board paper.

Any caustic can be used, particularly a caustic with monovalent metal ion such as sodium hydroxide, potassium hydroxide, lithium hydroxide etc. can be used, and readily commercially available caustics such as sodium hydroxide and potassium hydroxide are typically used. Although alkali metal base compounds such as sodium carbonate, that are not within the class of traditional defined light metal hydroxide caustics, can also be used if they function similarly to caustic in significantly raising the pH of the recycled fibers.

The concentration of caustic solution that is typically used is an aqueous solution of 0.01% to 2.0% and more typically 0.05% to 0.5% alkali metal hydroxide. This concentration is based upon the weight to volume concentration of caustic, and not the weight percentage of caustic based upon the weight of the fiber. Thus for example, if caustic is added to fiber in a hydropulper and the consistency of recycled fiber in the hydropulper is 4%, the corresponding dosage of caustic will be 0.25 to 50% based upon the fiber weight.

The typical embodiments of the treatment of this invention is to either (1) add caustic directly to the fiber in the hydropulper or (2) to soak the recycled paper or board fiber with caustic before pulping. The time of treatment of the fiber can range from as little as 2 minutes to as long as 48 hours. Although longer treatment times will not adversely affect the results, the time of treatment can be optimize by one skilled in the art to give good results while keeping the process commercially efficient. Although increased temperature may facilitate the rate of treatment of the fiber, elevated temperatures are not required and the caustic treatment can be carried out at the temperatures commonly encountered in commercial paper mills.

Small amounts of surfactant such as isotridecanol polyglycol ether, can be used with the caustic solution to facilitate the penetration of the caustic into the fibers.

After the recycled fibers are treated with the caustic solution, the caustic solution is then removed from the fibers. The removal can be on a conventional drum washer, screw press or similar dewatering equipment. If desired, the caustic solution can be reused for treatment of other recycled fiber.

The above described caustic treatment is typical applied to the recycled fibers in the repulping stage, the treatment can be applied at any time before the forming of the paper is formed. Thus, for example, the caustic treatment can be applied after refining of the fiber before the fibers are dewatered and formed into paper rolls that are used in the conventional gypsum board manufacturing process.

Nail pull resistance of a gypsum wallboard is a measure of a combination of the strengths of the board's gypsum core, its paper cover sheets, and the bond between the paper and the gypsum. The test measures the maximum force required to pull a nail with a head through the board until major cracking of the board occurs, and is carried out in accordance with ASTM C473-95.

The method of preparing the gypsum wallboard product of this invention and the improved nail-pull strength of the gypsum wallboard as shown in the following examples that are intended to be illustrative of the current invention and not limiting thereof:

EXAMPLES

Example 1

485 grams of Double Lined Kraft (DLK) torn in ~2.54 cm. (1 inch) square pieces was slushed in a Valley beater with tap water and 0.1% sodium hydroxide respectively at 2.4% consistency. The pH ranges of the pulp slurry with the use of tap water was 7.0-7.5 and the use of 0.1% sodium hydroxide was 11-11.5 After the fibers had been completely separated (about 1 hour for 0.1% sodium hydroxide solution and 2 hours for tap water), the pulp suspension was filtrated in a square handsheet mold. The thickened pulp (about 15% consistency) was put back in the Valley beater. Tap water was added to a ~2.5% consistency and the pH of the pulp was adjusted with sulfuric acid to 7.5. The pulp was then refined to different degrees of freeness. Pulp samples were taken out at each freeness level and handsheets were made. After standard conditioning, physical properties of the handsheets were measured and the results were plotted on the graph in FIG. 4. As seen in the results in FIG. 4, the tensile strength of the handsheets was improved significantly with the caustic treatment, especially for those at relatively low freeness levels. Referring to FIGS. 2 and 3, the graph shows the unexpected improvement in the nail pull strength of gypsum wall board made with the paper handsheets that are made with fiber pulped with sodium hydroxide in accordance with the process of this invention.

In experimental testing of the effect of caustic treatment time on the improvement of the tensile strength of the panel over a treatment period of from 5 minutes to 2 hours, a maximum improvement in tensile strength was achieved after 2 hours treatment.

As expected, the use of higher temperatures during the caustic treatment reduced the amount of time required to achieve the maximum level of improvement in tensile strength.

Nail Pull resistance for laboratory prepared samples of typical paper-covered gypsum board was measured against control samples of laboratory prepared gypsum board made with paper with untreated fiber in accordance with the following procedure:

A 6"×10" envelop was made with the experimental paper on one side and the regular wallboard backing paper on the other side with the help of a piece of ½ inch thick plywood and adhesive tape. The envelop was placed in an aluminum form with a gap of ½". Slurry was scooped from the wallboard production line at the wallboard plant and poured into the envelop. Boards were then clamped in the aluminum form in which the boards were pressed. After the gypsum set, boards were released from the mold and oven-dried at 110 degrees Fahrenheit for 24 hours and conditioned at 70 degrees Fahrenheit with 50% relative humidity for 24 hours prior to nail pull testing. A 7/64th inch drill was used to drill pilot holes through the thickness of the small boards. Four pilot holes were drilled from in a diagonal line starting at 1 inch from the bottom and side to the top leaving 1 inch from the top of the gypsum and the side of the board. Specimens were placed on a specimen-support plate with a 3 in diameter hole in the center. The support plate is 6 inch×6 inch in size. The plate is perpendicular to the travel of the test nail. The specimens were set on the support plate with the pilot hole aligned with the nail shank tip. Load was applied at the strain-rate of 1 in/minute until maximum load is achieved. At 90% of the peak load after passing the peak load, the testing stops and the peak load is recorded as nail pull resistance.

The results are reported in the bar graphs in FIGS. 2 and 3. The nail pull strength of the boards in FIG. 3 was "normalized" for paper basis weight to exclude the effect of variation in paper basis weight on the nail pull strength of the test boards so a comparison can be made based upon the same paper basis weight for the control bench board and the bench boards made in accordance with this invention. The use of normalization is intended to account for any changes in nail pull strength that may be attributed solely to the weight of paper used in making the wallboard, and has been based upon actual testing of wallboard made on both lab scale and on commercial production lines.

The nail pull normalization is based upon the well known empirically determined relationship in the gypsum wallboard art that 4.545 Kg. (10 LBS.) weight of wallboard paper weight will in a nail pull strength of wallboard made with said paper of approximately 1.105 Kg./m. (8 lbs/ft.). The nail pull strength results reported for example 1 in FIG. 3, as well as the results for Examples 2, 3 and Comparative Example 1, below, which are shown in FIGS. 5-8, have been "normalized" for nail pull strength based upon the actual weight of the wallboard paper made with recycled fiber prepared in accordance with this invention and with the starch in Comparative Example 1, compared to the control wallboard made with paper from fiber that has not been pre-treated in accordance with this invention. In this way, the reported results show both the absolute increase in nail pull strength achieved with the wallboard made with the paper prepared from the treated recycled fiber of this invention as well as the relative increase in nail pull strength that is achieved when the contribution of any differences in the weight of wallboard paper that is used to make the wallboard is taken into account.

In example 1, the final board weight and nail pull resistance were measured. The results are reported in the bar graphs in FIGS. 2 and 3. The results in FIGS. 2 and 3 show that boards prepared in accordance with the invention exhibited higher overall strength (nail pull resistance) compared with control boards. In all instances, shown in FIGS. 2-3 as well as in FIGS. 5-7 for Examples 2 and 3 below, the nail pull strength of the boards made with the caustic treated fibers was about 3% to about 8%, and more typically about 3% to about 6% higher than the nail pull strength made with the same freeness levels of untreated control fibers.

Example 2

This example tested the effect of 0.2% sodium hydroxide treatment on nail pull strength of gypsum board.

450 grams of DLK was repulped in a Valley beater with 20 liters of tap water and 0.2% sodium hydroxide aqueous solution, respectively at 2% consistency, at room temperature i.e. 22° C. The pH ranges of the pulp slurry with the use of tap water was about 7.0-7.5 and the pH of the pulp slurry with the 0.2% sodium hydroxide solution was about 11.5-12.0. After the fibers had been completely separated, the pulp suspension was filtrated in a square handsheet mold. The pH of the filtered pulp was about 10.84. The thickened pulp was put back in the Valley beater. Tap water was added to the filtered pulp up to a total of 20 liters to a 2% consistency and sulfuric acid solution was then added to the filtered pulp and water to adjust the pH to about 8.50. The pulp was then refined to different degrees of freeness (refinement). Pulp samples were taken out at each freeness level and three square handsheets were made. The handsheets were then used to make three small bench gypsum boards at each freeness level, as described in Example 1. After conditioning, the nail pull strength of the boards were measured and are shown in FIG. 5. The nail pull resistance results for Example 2 that have been normalized for weight of wallboard paper are shown in FIG. 6.

In all the freeness levels, the nail pull strength of the boards with sodium hydroxide treated fibers have significantly higher nail pull strength than that of those with untreated fibers.

Example 3

This example was performed to determine the effects of potassium hydroxide and sodium carbonate in treating recycled fiber for wallboard.

60 grams of DLK was repulped in a small lab hydropulper with tap water, 0.2% potassium hydroxide and 0.2% sodium carbonate respectively at 4% consistency. The pH of the pulp suspension for tap water, 0.2% potassium hydroxide and 0.2% sodium carbonate were 7.7-8.0, 11.0-11.5, and 9.5-10.0 respectively. After the fibers had been completely separated (about 2 hours), the pulp suspension was filtrated in a square handsheet mold. The thickened pulp (at about 15% consistency) was put back in a bucket. Tap water was added to a 1.5% consistency and the pH was adjusted with sulfuric acid to 7.54. The handsheets were then made and used for casting small bench gypsum boards. After conditioning, the nail pull strength of the boards was measured and the results normalized for the weight of paper used were plotted on the graph in FIG. 7.

The nail pull strength of the boards with both potassium hydroxide and sodium carbonate treated fibers is significantly higher than the nail pull strength of wallboard made with paper made from untreated recycled fibers.

Comparative Example 1

This example was performed to determine the effect of starch treatment of recycled fiber for wallboard on both tensile strength of paper made from the fiber and on nail pull strength of wallboard made with the starch treated recycled fiber paper.

400 grams of DLK was repulped in a Valley beater with tap water at 2% consistency. After the fibers had been completely separated, the pulp suspension was transferred to a bucket. The pulp was used to make handsheets with 0, 16, and 20 lb/t of Solvates N cationic starch. The contact time between starch and fiber was 10minutes. Small bench gypsum boards were then cast using the handsheets made. After conditioning, the nail pull strength of the boards was measured and the results were shown in the bar graph in FIG. 8.

The results show that increase in the tensile strength of recycled fiber by treatment with cationic starch addition will improve the tensile strength of the handsheets, but the improved tensile strength of the hand sheets with starch does not improve the nail pull strength of the boards made from the starch treated fiber paper.

Having completed a detailed disclosure of the embodiments of my invention so that those skilled in the art may practice the same, it is apparent that variations may be made without departing from the essence of the invention or the scope of the appended claims.

We claim:

1. A method of making a gypsum wallboard with improved nail pull strength comprising:
    treating recycled paper pulp containing recycled fiber with an aqueous caustic solution at a pH of 11 to 12 for a period of 5 minutes to 2 hours, while said recycled fiber is pulped to separate the recycled fiber from the pulp,
    removing the caustic solution from the fiber,
    adding an aqueous solution to the dewatered fiber and then pulping to separate the fibers,
    forming the recycled fiber into a wallboard paper in a paper making process, then adding a gypsum slurry between a bottom layer and top layer of said wallboard paper to form a green wet gypsum board, and then drying the green gypsum board to form the gypsum wallboard.

2. The method of claim 1, further comprising adding an aqueous acid solution to the caustic treated recycled fiber after the pH of the fibers have reached a pH of 11 to 12 and the caustic solution has been removed from the fibers by dewatering by use of a dewatering device, to adjust the pH to about 8.5 before the fiber is formed into wallboard paper.

3. The method of claim 1, wherein aluminum sulfate solution is added to the caustic treated fiber to adjust the pH to about 8.5 before the fiber is formed into a wallboard paper.

4. The method of claim 1, wherein the caustic is used in an aqueous solution of 0.01 to 2.0%, based upon the weight of caustic to volume of aqueous solution.

5. The method of claim 3, wherein the caustic solution is 0.05 to 0.5%, based upon the weight of caustic to volume of aqueous solution.

6. The method of claim 1, wherein said caustic solution is an aqueous solution of an alkali metal hydroxide.

7. The method of claim 6, wherein the alkali metal hydroxide is selected from the group consisting of sodium hydroxide, potassium hydroxide, and mixtures thereof, and the caustic solution is removed from the fibers by dewatering and the pH is maintained during the treating and prior to the dewatering in the absence of added acid.

8. The method of claim 1, wherein the caustic solution comprises an aqueous solution of sodium hydroxide.

9. The method of claim 1, wherein the caustic solution comprises an aqueous solution of potassium hydroxide.

10. The method of claim 1, wherein the caustic solution comprises an aqueous solution of sodium carbonate.

11. The method of claim 2, wherein the acid is sulfuric acid.

12. The method of claim 1, wherein after the recycled fiber is treated with an aqueous caustic solution at a pH of 11 to 12, and after the pH of the fibers have reached a pH of 11 to 12, excess caustic solution is removed from the fibers by dewatering by use of a dewatering device, and
    then the pH of the fiber is adjusted from pH of 11 to 12 to about 7.5 by addition of an aqueous acid solution to the fiber,
    then the fiber is formed into sheets of wallboard paper,
    an aqueous slurry of settable gypsum is deposited into a board form between two cover sheets of said wallboard paper, the gypsum sets to form a gypsum core and the gypsum and wallboard paper are dried at temperatures causing the excess water in said gypsum core to pass through both of said paper cover sheets.

13. The method of claim 1, wherein the nail pull strength is about 3% to about 8% higher than gypsum wallboard made with paper that has not been made with recycled fiber that has been pre-treated with caustic, wherein the caustic solution is removed from the fibers by dewatering by use of a dewatering device and reused for treatment of other recycled fiber.

14. The method of claim 12, wherein the caustic is an aqueous solution of an alkali metal hydroxide and the fiber consists of fiber from recycled paper.

15. The method of claim 12, wherein the caustic is an aqueous solution selected from the group consisting of sodium hydroxide, potassium hydroxide and mixtures thereof.

16. The method of claim 15, wherein the caustic is an aqueous solution of sodium hydroxide.

17. The method of claim 15, wherein the caustic is an aqueous solution of potassium hydroxide.

18. The method of claim 1, wherein the caustic solution is removed from the fibers by dewatering by use of a screw press and reused for treatment of other recycled fiber.

19. The method of claim 1, further comprising
adding an aqueous acid solution to the caustic treated recycled fiber after the pH of the fibers have reached a pH of 11 to 12 and the caustic solution has been removed from the fibers by dewatering by use of a dewatering device, to adjust the pH before the fiber is formed into wallboard paper, and wherein dewatering to remove the aqueous caustic solution from the fibers is by use of a dewatering device and the aqueous caustic solution removed from the fibers by the dewatering is reused for treating a second batch of pulp containing recycled fiber, wherein after dewatering acid is added to the dewatered.

20. The method of claim 2, wherein the fibers are treated with the caustic at a pH of 11 to 12 for a period of about 1 to 2 hours.

* * * * *